(12) United States Patent
Srinivas et al.

(10) Patent No.: US 9,374,306 B1
(45) Date of Patent: Jun. 21, 2016

(54) USING PACKET-TRANSPORT METRICS FOR SETTING DRCLOCKS

(75) Inventors: Shilpa Kowdley Srinivas, Herndon, VA (US); Anoop K. Goyal, Overland Park, KS (US); Bhagwan Khanka, Lenexa, KS (US); Hemanth Balaji Pawar, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 698 days.

(21) Appl. No.: 12/397,855

(22) Filed: Mar. 4, 2009

(51) Int. Cl.
*H04L 12/801* (2013.01)
*H04L 12/26* (2006.01)

(52) U.S. Cl.
CPC ............. *H04L 47/10* (2013.01); *H04L 43/50* (2013.01)

(58) Field of Classification Search
CPC ........................................................ H04L 47/10
USPC ........................................................ 370/252
See application file for complete search history.

(56) References Cited

U.S. PATENT DOCUMENTS

| | | | |
|---|---|---|---|
| 5,649,299 A | 7/1997 | Battin et al. | |
| 5,890,067 A | 3/1999 | Chang et al. | |
| 5,995,923 A | 11/1999 | Mermelstein et al. | |
| 6,014,568 A | 1/2000 | Alperovich et al. | |
| 6,021,328 A | 2/2000 | Curtis et al. | |
| 6,081,229 A | 6/2000 | Soliman et al. | |
| 6,148,207 A | 11/2000 | Baum | |
| 6,161,022 A | 12/2000 | Hwang et al. | |
| 6,172,974 B1 | 1/2001 | Tseng et al. | |
| 6,208,631 B1 | 3/2001 | Kim | |
| 6,223,041 B1 | 4/2001 | Egner et al. | |
| 6,243,590 B1 | 6/2001 | Reddy et al. | |
| 6,272,358 B1 | 8/2001 | Brent et al. | |
| 6,418,147 B1 | 7/2002 | Wiedeman | |
| 6,480,541 B1 | 11/2002 | Girod et al. | |
| 6,501,736 B1 | 12/2002 | Smolik et al. | |
| 6,522,888 B1 | 2/2003 | Garceran et al. | |
| 6,526,029 B1 | 2/2003 | Zhong | |
| 6,577,616 B1 | 6/2003 | Chaudry et al. | |
| 6,591,110 B1 | 7/2003 | Kim et al. | |
| 6,606,496 B1 | 8/2003 | Salvarani et al. | |
| RE38,244 E | 9/2003 | Han et al. | |
| 6,625,119 B1 | 9/2003 | Schuster et al. | |
| 6,718,183 B1 | 4/2004 | Blust et al. | |

(Continued)

FOREIGN PATENT DOCUMENTS

WO WO 2004/004249 A1 1/2004
WO 2004/028095 4/2004

OTHER PUBLICATIONS

First Action Interview Pilot Program Pre-Interview Communication from U.S. Appl. No. 11/746,229, mailed Dec. 30, 2009.

(Continued)

*Primary Examiner* — Samina Choudhry (57) ABSTRACT

Methods and systems are provided for using packet-transport metrics for setting DRCLocks. In an embodiment, an access node provides packet-data service to access terminals, which comprises (a) providing wireless service over an air interface in a wireless coverage area and (b) providing transport service over a packet-data network. The access node measures, over at least the packet-data network, each packet-transport metric in a set of one or more packet-transport metrics. The access node sets a DRCLock for at least one of the access terminals based at least in part on the one or more measured packet-transport metrics.

23 Claims, 3 Drawing Sheets

(56) References Cited

U.S. PATENT DOCUMENTS

| | | |
|---|---|---|
| 6,745,012 B1 | 6/2004 | Ton et al. |
| 6,757,520 B2 * | 6/2004 | Attar et al. ............. 455/63.1 |
| 6,775,252 B1 | 8/2004 | Bayley |
| 6,839,356 B2 | 1/2005 | Barany et al. |
| 6,856,954 B1 | 2/2005 | Su |
| 6,944,454 B1 | 9/2005 | Lee et al. |
| 6,970,437 B2 | 11/2005 | Lott et al. |
| 6,970,871 B1 | 11/2005 | Rayburn |
| 6,975,609 B1 | 12/2005 | Khaleghi et al. |
| 6,980,523 B1 | 12/2005 | Lipford et al. |
| 7,058,124 B2 | 6/2006 | Koo |
| 7,099,283 B2 | 8/2006 | Matta et al. |
| 7,120,447 B1 | 10/2006 | Chheda et al. |
| 7,130,287 B2 | 10/2006 | Nounin et al. |
| 7,130,311 B2 | 10/2006 | Yavuz et al. |
| 7,142,562 B2 | 11/2006 | Yavuz et al. |
| 7,190,958 B1 | 3/2007 | Yarkosky |
| 7,209,758 B1 | 4/2007 | Moll et al. |
| 7,236,796 B2 | 6/2007 | Soliman |
| 7,245,915 B2 | 7/2007 | Matta et al. |
| 7,328,027 B1 | 2/2008 | Mangal |
| 7,394,789 B2 * | 7/2008 | Sakawa et al. ............. 370/331 |
| 7,406,319 B2 | 7/2008 | Kostic et al. |
| 7,411,923 B2 | 8/2008 | Attar et al. |
| 7,411,974 B2 | 8/2008 | Attar et al. |
| 7,426,180 B2 | 9/2008 | Xu |
| 7,426,395 B2 | 9/2008 | Stephens |
| 7,433,682 B1 | 10/2008 | Moll et al. |
| 7,440,431 B2 | 10/2008 | Sindhushayana et al. |
| 7,474,627 B2 | 1/2009 | Chheda et al. |
| 7,486,645 B2 | 2/2009 | Li et al. |
| 7,496,058 B2 | 2/2009 | Kim et al. |
| 7,602,722 B2 | 10/2009 | Chheda |
| 7,729,243 B2 | 6/2010 | Ananthaiyer |
| 7,742,768 B2 | 6/2010 | Liu et al. |
| 7,746,816 B2 | 6/2010 | Attar et al. |
| 7,751,839 B2 | 7/2010 | Bowers et al. |
| 7,764,651 B2 | 7/2010 | Kwon |
| 7,822,064 B2 | 10/2010 | Thubert |
| 7,852,759 B2 | 12/2010 | Stephenson |
| 7,921,348 B2 | 4/2011 | Seidel et al. |
| 7,953,048 B2 | 5/2011 | Yoon et al. |
| 8,014,280 B2 | 9/2011 | Zhang et al. |
| 8,040,803 B1 | 10/2011 | Pawar et al. |
| 8,094,623 B2 | 1/2012 | Attar et al. |
| 2002/0061749 A1 | 5/2002 | Hunzinger |
| 2002/0151310 A1 | 10/2002 | Chung et al. |
| 2002/0191693 A1 | 12/2002 | Nakagaki |
| 2003/0017831 A1 | 1/2003 | Lee et al. |
| 2003/0064741 A1 | 4/2003 | Silva et al. |
| 2003/0072278 A1 * | 4/2003 | Wu et al. ............. 370/329 |
| 2003/0095551 A1 * | 5/2003 | Gotoh et al. ............. 370/395.3 |
| 2003/0114172 A1 | 6/2003 | Soliman |
| 2003/0117956 A1 | 6/2003 | Lee |
| 2003/0129982 A1 | 7/2003 | Perini |
| 2003/0163558 A1 | 8/2003 | Cao et al. |
| 2003/0195006 A1 | 10/2003 | Choong et al. |
| 2004/0017860 A1 | 1/2004 | Liu |
| 2004/0037291 A1 * | 2/2004 | Attar et al. ............. 370/395.4 |
| 2004/0057420 A1 | 3/2004 | Curcio et al. |
| 2004/0071086 A1 | 4/2004 | Haumont et al. |
| 2004/0179525 A1 | 9/2004 | Balasubramanian et al. |
| 2004/0196852 A1 | 10/2004 | Aksu et al. |
| 2004/0213182 A1 | 10/2004 | Huh et al. |
| 2004/0218533 A1 | 11/2004 | Kim et al. |
| 2004/0259565 A1 | 12/2004 | Lucidarme |
| 2005/0032522 A1 | 2/2005 | Soong et al. |
| 2005/0052996 A1 | 3/2005 | Houck et al. |
| 2005/0111397 A1 | 5/2005 | Attar et al. |
| 2005/0130663 A1 | 6/2005 | Hong et al. |
| 2005/0153695 A1 | 7/2005 | Cho |
| 2005/0159165 A1 | 7/2005 | Argyropoulos et al. |
| 2005/0201289 A1 | 9/2005 | Smolinske et al. |
| 2005/0250509 A1 | 11/2005 | Choksi |
| 2005/0286440 A1 | 12/2005 | Strutt et al. |
| 2006/0077994 A1 | 4/2006 | Spindola et al. |
| 2006/0121855 A1 | 6/2006 | Dillon |
| 2006/0126509 A1 | 6/2006 | Abi-Nassif et al. |
| 2006/0159051 A1 | 7/2006 | English |
| 2006/0182062 A1 | 8/2006 | Sdralia et al. |
| 2006/0223585 A1 | 10/2006 | Legg |
| 2006/0229087 A1 | 10/2006 | Davis, III et al. |
| 2006/0250953 A1 | 11/2006 | Mooney |
| 2006/0252429 A1 | 11/2006 | Chen et al. |
| 2006/0268764 A1 | 11/2006 | Harris |
| 2006/0291383 A1 | 12/2006 | Bi et al. |
| 2007/0060165 A1 | 3/2007 | Black et al. |
| 2007/0099648 A1 | 5/2007 | Kim et al. |
| 2007/0109967 A1 | 5/2007 | Ha |
| 2007/0127407 A1 | 6/2007 | Attar et al. |
| 2007/0127522 A1 | 6/2007 | Lundh et al. |
| 2007/0177510 A1 | 8/2007 | Natarajan et al. |
| 2007/0178906 A1 | 8/2007 | Gao et al. |
| 2007/0183427 A1 | 8/2007 | Nylander et al. |
| 2007/0197223 A1 | 8/2007 | Jung et al. |
| 2007/0201438 A1 * | 8/2007 | Yoon et al. ............. 370/352 |
| 2007/0201439 A1 | 8/2007 | Sun et al. |
| 2007/0242702 A1 * | 10/2007 | Shim ............. 370/516 |
| 2007/0274257 A1 | 11/2007 | Bae et al. |
| 2008/0008093 A1 | 1/2008 | Wang |
| 2008/0049699 A1 | 2/2008 | Li et al. |
| 2008/0049706 A1 | 2/2008 | Khandekar et al. |
| 2008/0130495 A1 | 6/2008 | Dos Remedios et al. |
| 2008/0186862 A1 | 8/2008 | Corbett et al. |
| 2008/0188228 A1 | 8/2008 | Pecen et al. |
| 2008/0207170 A1 | 8/2008 | Khetawat et al. |
| 2008/0233967 A1 | 9/2008 | Montojo et al. |
| 2008/0247450 A1 * | 10/2008 | Alexander et al. ............. 375/224 |
| 2008/0280615 A1 | 11/2008 | Vinayakray-Jani |
| 2009/0059790 A1 | 3/2009 | Calvert et al. |
| 2009/0088157 A1 | 4/2009 | Aaron |
| 2009/0141683 A1 | 6/2009 | Grinshpun et al. |
| 2009/0170547 A1 | 7/2009 | Raghothaman et al. |
| 2009/0187690 A1 | 7/2009 | Smart et al. |
| 2009/0257361 A1 | 10/2009 | Deshpande et al. |
| 2009/0262720 A1 | 10/2009 | Kwon et al. |
| 2009/0285159 A1 * | 11/2009 | Rezaiifar et al. ............. 370/328 |
| 2009/0288145 A1 | 11/2009 | Huber et al. |
| 2010/0014487 A1 | 1/2010 | Attar et al. |
| 2010/0189096 A1 | 7/2010 | Flynn et al. |
| 2010/0240373 A1 | 9/2010 | Ji et al. |
| 2010/0271962 A1 | 10/2010 | Han et al. |
| 2010/0296407 A1 | 11/2010 | Medvedev et al. |
| 2010/0309861 A1 | 12/2010 | Gorokhov et al. |
| 2011/0053596 A1 | 3/2011 | Wohlert et al. |
| 2011/0085607 A1 | 4/2011 | Dhandu et al. |
| 2011/0116419 A1 | 5/2011 | Cholas et al. |
| 2011/0292785 A1 | 12/2011 | Hardin |
| 2012/0044908 A1 | 2/2012 | Spinelli et al. |

OTHER PUBLICATIONS

U.S. Appl. No. 12/538,624, Final Office Action dated Dec. 19, 2011.
U.S. Appl. No. 12/478,318, Notice of Allowance dated Jan. 30, 2012.
U.S. Appl. No. 12/731,895, Non Final Office Action dated Mar. 23, 2012.
U.S. Appl. No. 12/432,736, Non Final Office Action dated Mar. 27, 2012.
U.S. Appl. No. 12/756,629, Non Final Office Action dated Mar. 29, 2012.
U.S. Appl. No. 12/494,999, Notice of Allowance dated Mar. 30, 2012.
Rosenberg, J. et al., "SIP: Session Initiation Protocol," Network Working Group, Request for Comments: 3261, Jun. 2002, pp. 1-265.
3rd Generation Partnership Project, "cdma2000 Femtocell Network: 1x and IMS Network Aspects," 3GPP2 X. S0059-2000-0, Version 1.0, Jan. 2010.
Kjellberg, Richard, "Analysis of an AIS Implementation in Tokyo Bay," web.archive.org/web/20090427053120/ http://www.gpc.se/tokyo/tokyo.htm (Apr. 27, 2009).
Xing, Jianping et al., "Research and Integration of Marine Embedded AIS Information Terminal," Proceedings of the 7th World Congress on Intelligent Control and Automation, Jun. 25-27, 2008, Chongqing, China, pp. 3586-3589.

(56) References Cited

OTHER PUBLICATIONS

Openwave, "Overview of Location Technologies," Nov. 19, 2002, 12 pages.
Unpublished U.S. Appl. No. 12/141,569, filed Jun. 18, 2008 entitled "Method for Initiating Handoff of a Wireless Access Terminal Based on the Reverse Activity Bit".
Unpublished U.S. Appl. No. 11/746,229, filed May 9, 2007 entitled "Using VoIP-Quality Metrics to Dynamically Adjust the EV-DO Reverse Activity Bit".
Unpublished U.S. Appl. No. 12/350,694, filed Jan. 8, 2009 entitled "Using Packet-Transport Metrics for Call-Admission Control".
Unpublished U.S. Appl. No. 12/432,736, filed Apr. 29, 2009 entitled "Using DRCLocks for Conducting Call Admission Control".
Unpublished U.S. Appl. No. 12/494,999, filed Jun. 30, 2009 entitled "Implementing Quality of Service (QoS) by Using Hybrid ARQ (HARQ) Response for Triggering the EV-DO Reverse Activity Bit (RAB)".
Unpublished U.S. Appl. No. 12/507,913, filed Jul. 23, 2009 entitled "Achieving Quality of Service (QoS) by Using the Reverse Activity Bit (RAB) in Creation of Neighbor Lists for Selected Access Terminals".
U.S. Appl. No. 12/388,199, filed Feb. 18, 2009.
U.S. Appl. No. 12/478,318, filed Jun. 4, 2009.
U.S. Appl. No. 12/538,624, filed Aug. 10, 1999.
U.S. Appl. No. 12/756,629, filed Apr. 8, 2010.
U.S. Appl. No. 12/731,895, filed Mar. 25, 2010.
U.S. Appl. No. 11/746,229, First Action Interview Summary dated Jun. 2, 2010.
U.S. Appl. No. 11/746,229, Notice of Allowance dated Aug. 3, 2010.
U.S. Appl. No. 11/746,229, Interview Summary dated Apr. 6, 2010.
U.S. Appl. No. 12/141,569, Non-Final Office Action dated Mar. 22, 2011.
U.S. Appl. No. 12/350,694, Non-Final Office Action dated Jun. 22, 2010.
U.S. Appl. No. 12/350,694, Final Office Action dated Dec. 9, 2010.
U.S. Appl. No. 12/350,694, Non-Final Office Action dated Feb. 18, 2011.
U.S. Appl. No. 12/350,694, Notice of Allowance mailed Jun. 10, 2011.
U.S. Appl. No. 12/388,199, Non-Final Office Action dated Mar. 30, 2011.
U.S. Appl. No. 12/478,318, Non-Final Office Action dated Dec. 8, 2010.
Ferrus, R. et al., "Evaluation of a Cell Selection Framework for Radio Access Networks considering Blackhaul Resource Limitations," The 18th Annual IEEE International Symposium on Personal, Indoor and Mobile Radio Communications (PIMRC'07).
Mino, E. et al., "IST-4-027756 Winner II, D4.8.3, Integration of Cooperation on Winner II System Concept," Information Society Technologies, pp. 1-102, Nov. 29, 2007.
Conklin, G. et al., "Video Coding for Streaming Media Delivery on the Internet," IEE Transactions on Circuits and Systems for Video Technology, 11(3):269-281 (Mar. 2001).
International Search Report and Written Opinion from International Application No. PCT/US2007/009296, dated Oct. 17, 2007.
Liu, Xiu et al., "Experiences in a 3G Network: Interplay between the Wireless Channel and Applications," MobiCom'08, pp. 211-222 (Sep. 14-19, 2008).
Yeo, Woon-Yong et al., "Traffic Management of High-Speed CDMA Systems Base on Loan Prediction," IEICE Electronics Express, 6(7):389-394 (Apr. 10, 2009).
3rd Generation Partnership Project 2, "cdma2000 High Rate Packet Data Air Interface," 3GPP2 C.S0024-0, v. 4.0 (Oct. 2002).
3rd Generation Partnership Project 2, "cdma2000 High Rate Packet Data Air Interface," 3GPP2 C.S0024-A, v. 3.0 (Sep. 2006).
Notice of Allowance for U.S. Appl. No. 12/350,694 dated Jun. 10, 2011.
Notice of Allowance for U.S. Appl. No. 12/141,569 dated Sep. 28, 2011.
U.S. Appl. No. 12/141,569, Notice of Allowance dated Sep. 28, 2011.
U.S. Appl. No. 12/388,199, Final Office Action dated Oct. 11, 2011.
U.S. Appl. No. 12/478,318, Non-Final Office Action dated Oct. 27, 2011.

\* cited by examiner

FIG. 1

| METRIC | METRIC THRESHOLD |
|---|---|
| DELAY | DELAY_THRESHOLD_202 |
| JITTER | JITTER_THRESHOLD_204 |
| PACKET LOSS | PACKET_LOSS_THRESHOLD_206 |

THRESHOLD TABLE 200

USING PACKET-TRANSPORT METRICS FOR SETTING DRCLOCKS

BACKGROUND

1. Technical Field

The present disclosure relates to wireless communications, and, more particularly, to managing access to coverage areas in wireless communication systems.

2. Description of Related Art

Many people use mobile stations, such as cell phones and personal digital assistants, to communicate with cellular wireless networks, which typically provide communication services such as voice, text messaging, and packet-data communication to these mobile stations. The mobile stations and networks typically communicate with each other over a radio frequency (RF) air interface according to a wireless protocol such as 1×RTT CDMA, EV-DO, WiMax, etc.

Mobile stations typically conduct these wireless communications with one or more base transceiver stations (BTSs), each of which send communications to and receive communications from mobile stations over the air interface. Each BTS is in turn communicatively connected with an entity known as a base station controller (BSC) (or radio network controller (RNC)), which controls one or more BTSs, and which acts as a conduit between the BTS(s) and one or more switches or gateways, such as a mobile switching center (MSC) and/or a packet data serving node (PDSN), which may interface with one or more signaling and/or transport networks.

As such, mobile stations can typically communicate with one or more endpoints over the one or more signaling and/or transport networks from anywhere inside the coverage area of one or more BTSs, via the BTS(s), a BSC, and an MSC and/or a PDSN. In typical arrangements, MSCs interface with the public switched telephone network (PSTN), while PDSNs interface with one or more core packet-data networks and/or the Internet.

OVERVIEW

When a mobile station engages in packet-data communication over one or more packet-data networks via one or more BTSs, one or more BSCs, and one or more PDSNs, that packet-data communication may be with one or more different types of endpoints. Some examples of endpoints include other mobile stations, landline phones, conference servers, gateways, etc. In the case of landline phones, a media gateway may reside between a packet-data network and a telephone network such as the PSTN. For simplicity of explanation, examples involving mobile stations communicating with one respective endpoint over a packet-data network via one BTS, one BSC, and one PDSN may be described herein; however, the present disclosure could just as well be applied to more complex examples, perhaps involving communication sessions between mobile stations and multiple endpoints, such as may be the case in a conference call.

Furthermore, a given instance of packet-data communication engaged in by a mobile station may be of any type. One popular type is Voice over IP (VoIP), which may have a user experience that is similar to voice calls conducted over the PSTN via a BTS, a BSC, and an MSC. VoIP calls (i.e. sessions) may also or instead take the form of push-to-talk (PTT) sessions, known to those in the art. In general, as used herein, "VoIP" encompasses any type of voice-over-packet communication that may be engaged in by mobile stations. More generally, the methods and systems described herein may be applied to any type of data communication, though doing so with respect to latency-sensitive types such as VoIP, video-conferencing, streaming media, etc. may yield the greatest dividends with respect to user satisfaction.

In connection with latency-sensitive types of packet-data communication, it is generally considered important that packets carrying bearer (e.g. voice) data traverse from source to destination quickly, consistently, and reliably, among other desirable descriptors. Stated in terms typically used in the art, it is important and desirable that bearer packets traverse between one endpoint of the communication (e.g. a mobile station) and the other (e.g. a media gateway residing between a packet-data network, such as the Internet, and the PSTN) with relatively little delay, jitter, or packet loss. These terms are referred to herein as packet-transport metrics; in the context of VoIP, they may be referred to as VoIP-quality metrics. Using VoIP as an example, if a VoIP call has relatively poor values of delay, jitter, and/or packet loss, then the voice quality (experienced by one, both, or all participants) will be degraded, which is undesirable.

Note that these packet-transport metrics could be measured between a mobile station and the other endpoint of the communication session, between a network element (e.g. BTS or BSC) and the other endpoint, or on some other subpart of a communication path of a communication session. In general, the metrics will be described herein as being measured between a network element (e.g. an access node) and the other endpoint in the communication session (i.e. on the backhaul), though this is for illustration and not limitation. This choice may, however, avoid mobile stations having to report these metrics to an access node, which will likely be the entity that is carrying out exemplary embodiments, making it an efficient choice for being one endpoint of the path along which these metrics are measured and evaluated.

With respect to the first of the packet-transport metrics referenced above, delay is generally defined as the time taken for packets to get from one point to another in a network. Note that delay can be measured one-way, round-trip, or both. Typically, measuring round-trip delay is easier and requires less-expensive equipment. Note that, to obtain rough estimate of one-way delay, round-trip delay can be measured and then divided in half. A typical tolerance level for one-way delay in a VoIP context may be approximately 150-250 milliseconds (ms), before the quality of call degrades to a point that is generally considered unacceptable.

Jitter is typically defined as the variation in delay over some period of time between the network points for which the delay is measured. In general, if the delay of VoIP-packet transmissions varies too widely during a particular VoIP call, in other words if the jitter is too high, then the call quality typically would be significantly degraded.

Finally, some VoIP packets transmitted from the source never make it to the destination; i.e. they are lost. Packet loss, then, is typically defined as the ratio of (i) the number of packets that never make it to their destination to (ii) the total number of packets that were transmitted (including those that made it to their destination and those that did not) over some time period. The higher this ratio is, the more the VoIP call quality will be degraded, since certain portions of the audio will not be available for playout, and retransmission is generally not thought to be a practical solution to packet loss in real-time applications such as VoIP.

When a given base station—and a given wireless network in general—provides packet-data service (e.g. VoIP service) to a given mobile station, the base station is providing at least two services to that mobile station. The first is wireless service over the air interface, and the other is transport service (i.e. connectivity) over one or more packet-data networks, such as direct transport service over the service provider's privately-operated core packet-data network, as well as indirect transport service over a public packet-data network such as or including the Internet. In general, the packet-transport metrics referred to herein pertain to the transport service, and reflect the quality of network (or "transport") conditions over the packet-data network(s) that the packets—sent to and from a given mobile station—traverse.

Note that, in contexts where wireless service is provided according to a protocol known as EV-DO (perhaps according to IS-856, Revision 0 and/or IS-856, Revision A, both of which are hereby incorporated herein by reference in their entirety), mobile stations are often referred to as access terminals, and BSCs are often referred to as RNCs (radio network controllers). Furthermore, a combination of an RNC and one or more BTSs is often referred to as an access node. This terminology will be adopted for the balance of this written description, though again for illustration and not to limit the described embodiments to any particular protocol.

As known to those of skill in the art, in EV-DO networks, access terminals use a reverse-link channel known as the DRC channel to request forward-link service from a particular network sector. Typically, an access terminal will specify the sector (or coverage area, more generally) from which the access terminal is requesting forward-link service by transmitting a particular value known as a DRC cover in the reverse-link DRC channel, where the DRC cover sent by the access terminal indicates a particular sector. Incidentally, the access terminal also includes data in the reverse-link DRC channel that indicates a particular data rate or particular packet-transmission format, depending on the implemented version of IS-856.

In any event, upon receiving a request for forward-link service (i.e. a DRC request) from an access terminal via the reverse-link DRC channel, a given EV-DO network sector may grant the request and provide forward-link service, in which case the access terminal receives forward-link service from that sector until the access terminal selects another sector, powers down, ceases communication, and/or some other event occurs. If, however, the sector (or more generally perhaps, the access node) determines that the requested sector is not able or willing to provide forward-link service to the access terminal, the sector typically transmits a value to the access terminal known as a DRCLock. In current implementations, the DRCLock is sent when a potential serving sector determines that it is not properly receiving (e.g. cannot properly decode) the reverse-link DRC channel from the access terminal, and thus concludes that it is not a good candidate to provide forward-link service to the access terminal.

Essentially, then, the DRCLock is a message from a sector to an access terminal, informing the access terminal that, at least for the time being, the sector is not an option for providing forward-link service to the access terminal. The DRCLock typically takes the form of a bit, where one of the two possible values (referred to herein as the DRCLock being "set") indicates that the sector is not an option for the access terminal, and where the other of the two possible values (referred to herein as the DRCLock being "clear" or "cleared") indicates that the sector is an option for the access terminal. In response to detecting that a sector has set the DRCLock for an access terminal, the access terminal typically programmatically points its DRC channel at another sector (i.e. transmits a DRC cover corresponding to another sector). The access terminal may then periodically check whether the first sector has cleared its DRCLock and, if so, point its DRC cover back at that first sector.

As described, in current implementations, sectors (and access nodes, more generally), determine whether to set a DRCLock on an access-terminal-by-access-terminal basis, depending on the air-interface conditions between the sector and the particular access terminal. Thus, it may well occur that there may be times where (i) an access node (i.e. one or more sectors thereof) is able to properly receive DRC requests from multiple (and perhaps numerous) access terminals, and thus becomes the forward-link serving sector for those access terminals and (ii) the transport conditions are unfavorable, perhaps due to poor values of at least one of delay, jitter, and packet loss on the transport/backhaul side. At these times, the access terminals for which the access node has agreed to be the serving sector may very well experience poor communication quality, such as choppy and/or intermittent VoIP audio, as one example.

Thus, in accordance with the present methods and systems, an EV-DO access node considers packet-transport metrics (such as packet loss, delay, and/or jitter) as at least part of the decision-making criteria when determining whether to set DRCLocks for one or more access terminals. In an embodiment, an access terminal (e.g. a sector) may maintain thresholds for one or more packet-transport metrics, such as a delay threshold, a jitter threshold, and/or a packet-loss threshold. The access node may periodically compare current values of one or more of those metrics against their respective thresholds and, if a certain number (e.g. one, two, or all) of the current values of the metrics exceed their respective threshold(s), the access node may responsively set the DRCLock for at least one access terminal. As far as selecting which access terminals for which to set DRCLock, an access node may make such a selection at random, according to tiered-service arrangements, according to the type of packet-data communication (e.g. best efforts, VoIP, etc.) in which an access terminal is engaging, and/or any other factor(s).

Note that an access node may consider the metrics in any order, and may consider only one or two of them. That is, the base station could consider (i) delay, (ii) jitter, (iii) delay and packet loss, etc. And it should be noted that evaluation of one or more packet-transport metrics need not be to the exclusion of considering other criteria for DRCLock decisions; some embodiments may well involve (i) not setting DRCLocks when no metrics exceed their thresholds and (ii) setting at least one DRCLock when at least one metric exceeds its threshold. However, other embodiments may involve setting at least one DRCLock when at least one metric exceeds its threshold, but may further condition setting at least one DRCLock on one or more other criteria. For one or more of the metrics, an access node could consider only a most-recently-measured value, an average over some previous time period, an average of a worst 10% (or some other percentage) of measurements over some previous time period, and/or any other relevant data set considered appropriate for a given implementation.

Furthermore, an access node, after determining to set (and then actually setting) one or more DRCLocks based on one or more packet-transport metrics exceeding one or more respective thresholds, may continue to periodically monitor the metrics and compare them to the respective one or more thresholds. In an embodiment, when an access node then concludes that, as an example, all of the packet-transport metrics have a value below their respective threshold, the access node may then clear one or more of the DRCLocks that it had previously set based at least in part on the one or more packet-transport metrics. In other embodiments, the access node may clear the DRCLocks in that situation on an accessterminal-by-access-terminal basis, depending for each access terminal on whether other criteria also indicate clearing the DRCLock.

Note that, in some embodiments, a dual-mode (e.g. EV-DO and 1×RTT CDMA ("1×")) access terminal that is denied service from a first network (e.g. an EV-DO network) may, according to the herein-described methods and systems, attempt to acquire resources from a second network (e.g. a 1× network).

And it should be noted that the above overview is intended to be illustrative and not limiting. Additional and/or different features may be present in some embodiments. And any description of a mobile station, access terminal, or other network element operating according to any particular protocol is by way of example and not limitation; any suitable wireless protocol(s) may be used, such as but not limited to 1×RTT CDMA, EV-DO, TDMA, AMPS, GSM, GPRS, UMTS, EDGE, WiMax (e.g. IEEE 802.16), LTE, microwave, satellite, MMDS, Wi-Fi (e.g. IEEE 802.11), Bluetooth, infrared, and/or any other now known or later developed.

BRIEF DESCRIPTION OF THE DRAWINGS

Various exemplary embodiments are described herein with reference to the following drawings, wherein like numerals denote like entities.

DETAILED DESCRIPTION OF THE DRAWINGS

1. Exemplary Architecture

Figure 1:
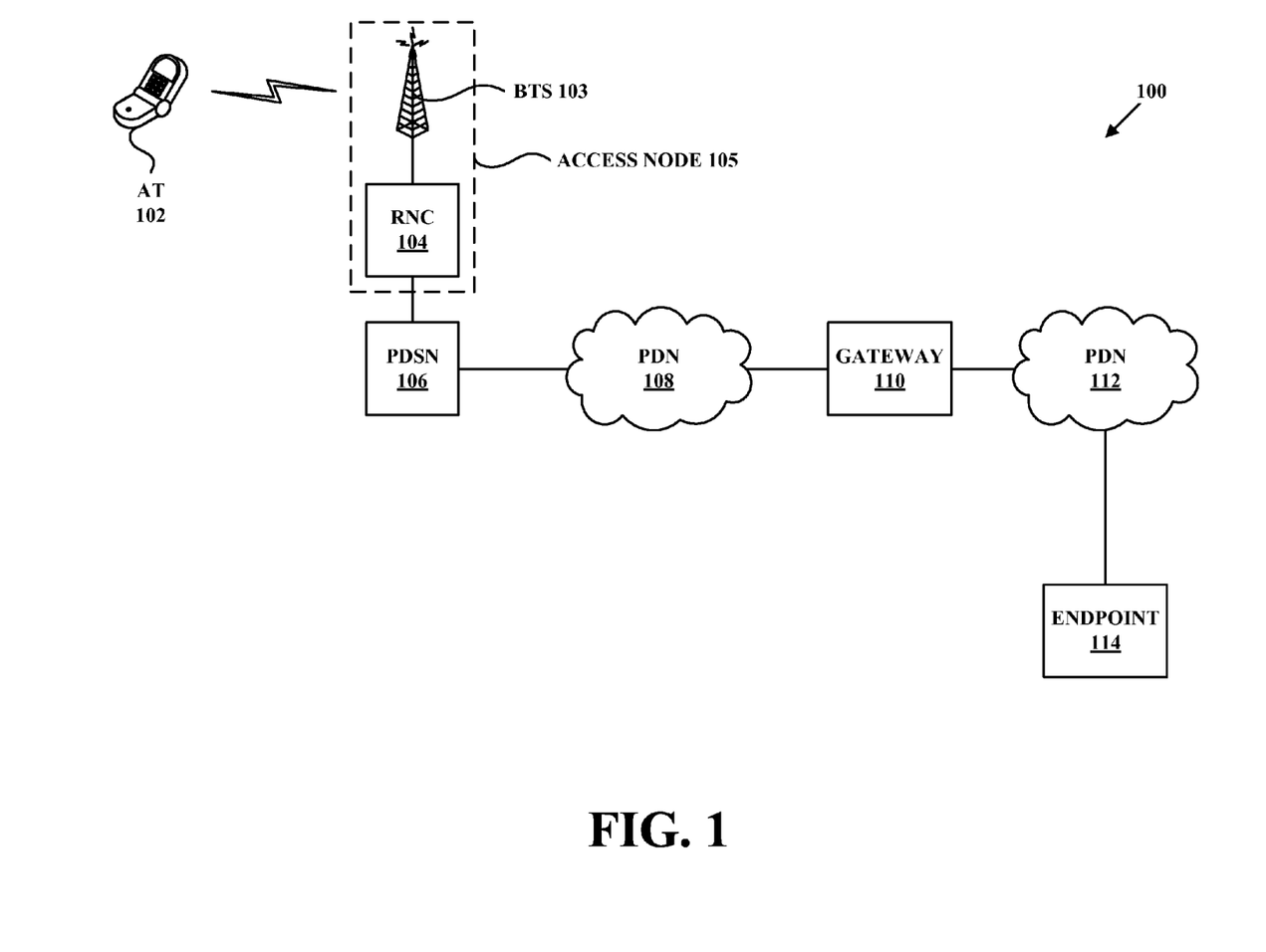
FIG. 1 is a simplified block diagram of a communication system, in accordance with exemplary embodiments.

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes an access terminal (AT) 102, an access node 105 (shown as comprising a BTS 103 and an RNC 104), a PDSN 106, a packet-data network (PDN) 108, a gateway 110, a PDN 112, and an endpoint 114. Note that additional entities not depicted in FIG. 1 could be present as well. As an example, there could be more than one access terminal in communication with access node 105; also, there could be additional entities in communication with PDN 108 and/or PDN 112. Also, there could be one or more routers, switches, other devices and/or networks making up at least part of one or more of the communication links.

Access terminal 102 may be any device arranged to carry out the access-terminal functions described herein, and may include a user interface, a wireless-communication interface, a processor, and data storage comprising instructions executable by the processor for carrying out those access-terminal functions. The user interface may include buttons, a touchscreen, a microphone, and/or any other elements for receiving inputs from users, as well as a speaker, one or more displays, and/or any other elements for communicating outputs to users.

The wireless-communication interface may comprise an antenna and a chipset for communicating with one or more base stations over an air interface. As an example, the chipset could be one suitable for engaging in EV-DO communications, including IS-856, Rel. 0 and/or IS-856, Rev. A communications. The chipset or wireless-communication interface in general may also be able to communicate with a 1×RTT CDMA network, a Wi-Fi (IEEE 802.11) network, and/or one or more additional types of wireless networks. The processor and data storage may be any suitable components known to those of skill in the art. As examples, access terminal 102 could be or include a cell phone, a PDA, a computer, a laptop computer, a hybrid IS-2000/IS-856 device, and/or a multimode Wi-Fi/cellular device.

BTS 103 may be any one or any combination of network elements arranged to carry out the BTS functions described herein, and may include a communication interface, a processor, and data storage comprising instructions executable by the processor to carry out those BTS functions. The communication interface may include one or more antennas and chipsets or other components for providing one or more coverage areas such as cells or sectors according to a protocol such as CDMA, EV-DO, WiMax, or any other suitable protocol. The communication interface may also include a wired or wireless packet-data interface (which may be characterized as a backhaul connection) such as an Ethernet interface for communicating with RNC 104.

RNC 104 may be any one or any combination of network elements arranged to carry out the RNC functions described herein. As such, RNC 104 may include a communication interface, a processor, and data storage comprising instructions executable by the processor to carry out those RNC functions. The communication interface may include a wired or wireless packet-data interface (which may be characterized as a backhaul connection) such as an Ethernet interface for communicating directly or over one or more networks with PDSN 106. In general, RNC 104 functions to control one or more BTSs, and to serve as a conduit between the one or more BTSs and PDSN 106, enabling access terminals to communicate over PDN 108 and perhaps beyond.

Note that access node 105 may comprise BTS 103 and RNC 104, and may comprise one or more additional BTSs as well. In general, access node 105 provides wireless service to access terminals over an air interface, and transport service over PDN 108 (or perhaps PDN 108 and PDN 112) to those access terminals using a backhaul connection. Access node 105 may further be able to (i.e. comprise hardware, firmware, and/or software programmed with the functionality to) measure, as is known in the art, one or more packet-transport metrics such as delay, jitter, and packet loss with respect to communications between access terminals such as access terminal 102 and endpoints such as endpoint 114.

Figure 2:
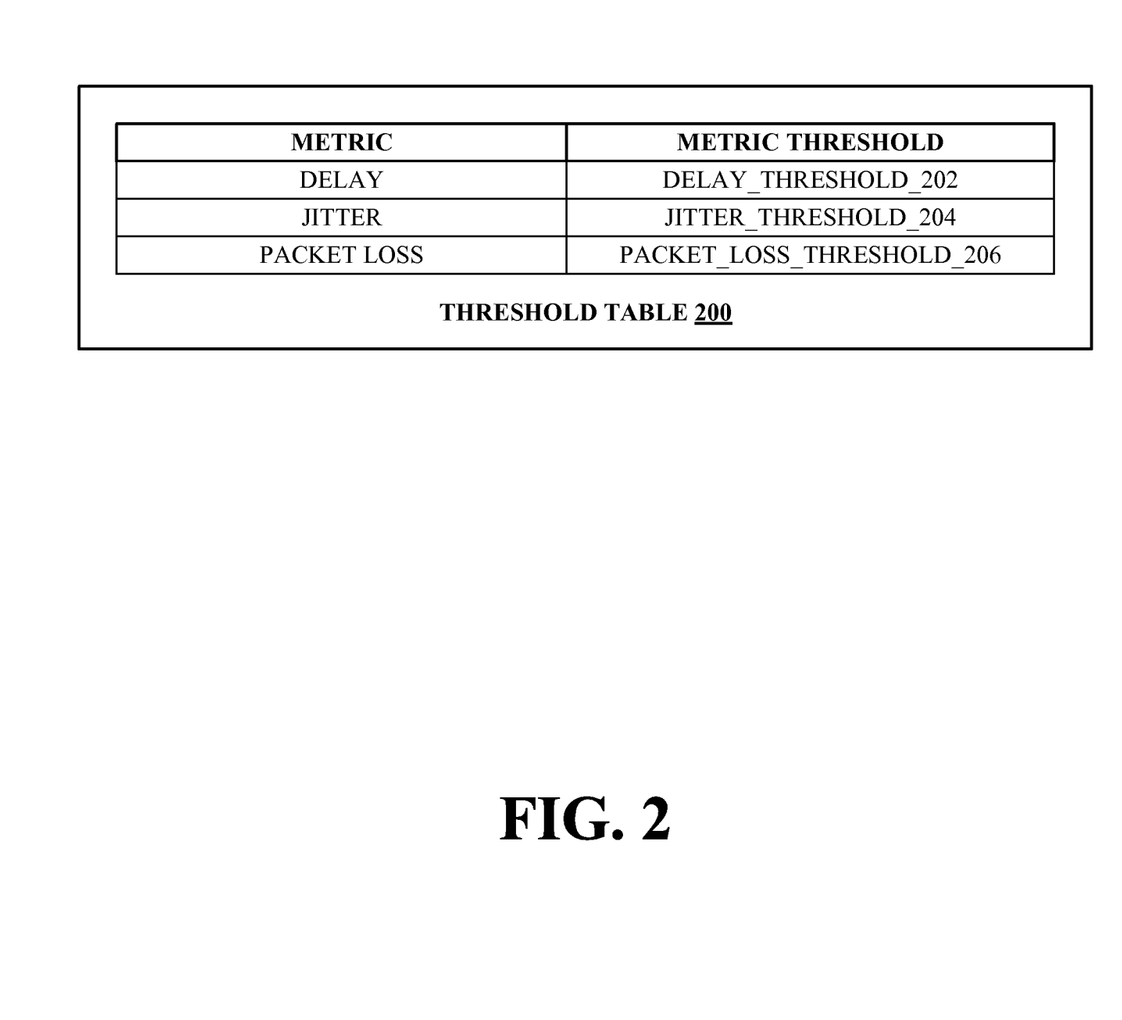
FIG. 2 depicts a data table, in accordance with exemplary embodiments.

Furthermore, access node 105 may store—or have access to—thresholds for a set of one or more packet-transport metrics. FIG. 2 depicts one possible arrangement of threshold data that access node 105 may store in data storage or may have access to from one or more other network entities, such as PDSN 106 and/or any other entities. FIG. 2 depicts a threshold table 200, which includes packet-transport-metric thresholds associated with three packet-transport metrics: delay threshold 202 (associated with delay), jitter threshold 204 (associated with jitter), and packet-loss threshold 206 (associated with packet loss). Note that other packet-transport-metric thresholds could be stored in table 200—and considered in accordance with making decisions to set or clear DRCLocks for one or more access terminals—instead of or in addition to delay threshold 202, jitter threshold 204, and packet-loss threshold 206.

Note as well that the thresholds 202-206 may take on any values suitable for a particular implementation. In some embodiments, delay threshold 202 may be approximately 150-250 ms. In some embodiments, jitter threshold 204 may be approximately 10-20 ms. In some embodiments, packet-loss threshold 206 may be approximately 1%, 2%, 5%, or thereabouts. And other values could certainly be used as well.

Returning to FIG. 1, PDSN 106 may be any networking server or other device arranged to carry out the PDSN functions described herein. PDSN 106 may include a communication interface, a processor, and data storage comprising instructions executable by the processor for carrying out those PDSN functions. The communication interface may include a wired packet-data interface such as an Ethernet interface for communicating with access node 105 and/or over PDN 108. Note that PDSN 106 may, instead or in addition, comprise a wireless-communication interface for communicating with access node 105 and/or over PDN 108. Note also that PDSN 106 may use the same interface or separate interfaces for communicating with access node 105 and for communicating over PDN 108. PDSN 106 may generally function to provide access node 105 with access to PDN 108, and vice versa.

Each of PDN 108 and PDN 112 may include one or more wide area networks, one or more local area networks, one or more public networks such as the Internet, one or more private networks, one or more wired networks, one or more wireless networks, and/or one or more networks of any other type. Devices in communication with PDN 108 and/or PDN 112 may exchange data using a packet-switched protocol such as IP, and may be identified by an address such as an IP address. In this example, PDN 108 is the service provider's privately-operated IP network (where the service provider may operate at least access node 105 and PDSN 106), while PDN 112 is the Internet. However, this is for illustration and not by way of limitation. In some embodiments, PDSN 106 may connect directly to the Internet, in which case PDN 108 and gateway 110 may not be necessary. And other configurations are possible as well.

Gateway 110 may be any networking server or other device arranged to carry out the gateway functions described herein. Thus, gateway 110 may include a communication interface, a processor, and data storage comprising instructions executable by the processor for carrying out those gateway functions. The communication interface may include a wired packet-data interface such as an Ethernet interface for communicating over PDN 108 and/or PDN 112. Note that gateway 110 may, instead or in addition, comprise a wireless-communication interface for communicating over PDN 108 and/or PDN 112. Gateway 110 may use the same interface or separate interfaces for communicating over PDN 108 and/or PDN 112. Gateway 110 may generally function to provide PDN 108 and PDN 112 with connectivity to each other.

Endpoint 114 may be any device arranged to carry out the endpoint functions described herein. As such, endpoint 114 may include a (wired and/or wireless) communication interface, a processor, and data storage comprising instructions executable by the processor for carrying out those endpoint functions. Endpoint 114 may be or include a media gateway (perhaps connected to the PSTN), a packet-based telephone, a personal computer, a PDA, a mobile station, an access terminal, a PTT server, a call server, and/or any other type of device capable of functioning as an endpoint of a VoIP—or other type of packet-data-communication—session in accordance with exemplary embodiments.

2. Exemplary Operation

Figure 3:
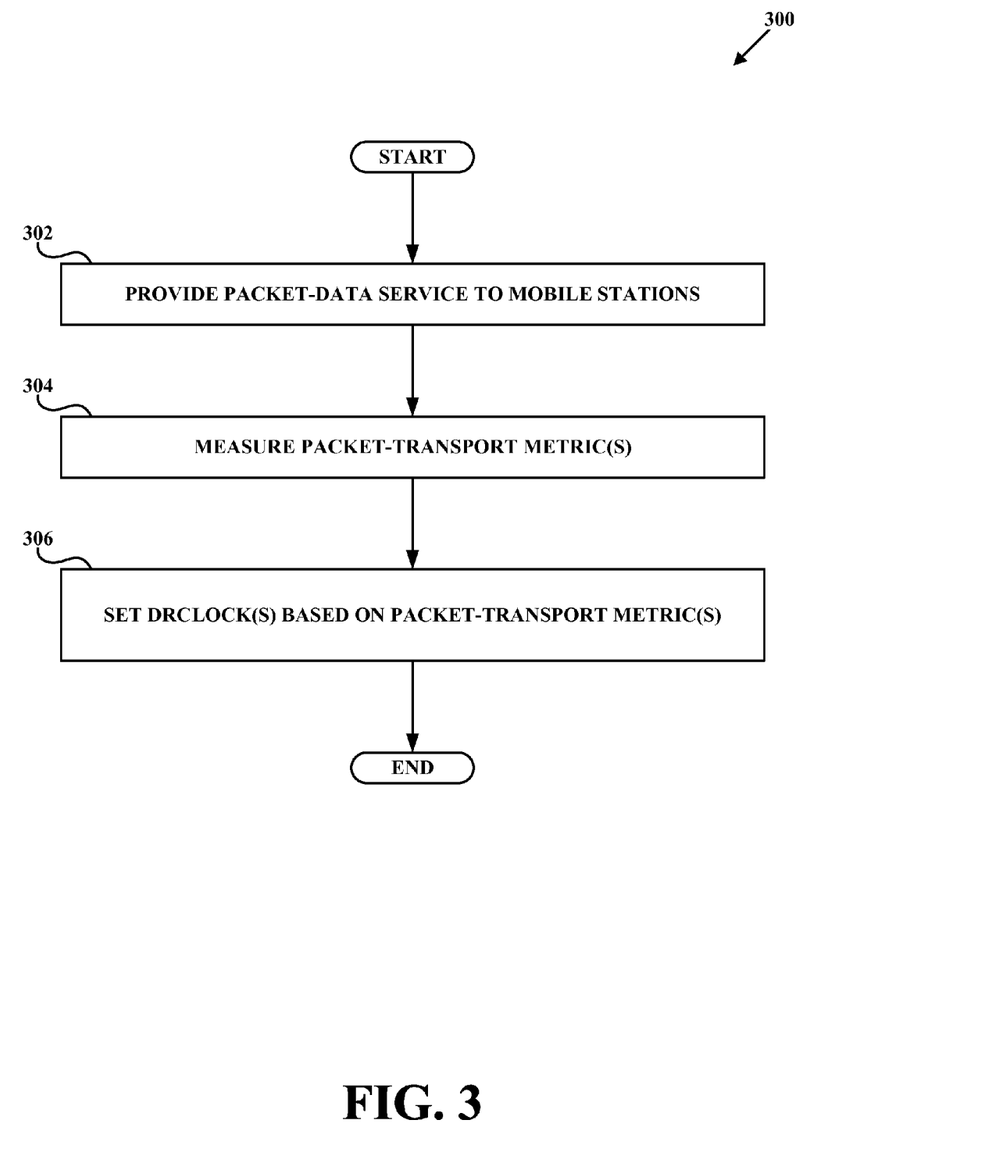
FIG. 3 is a flowchart of a method, in accordance with exemplary embodiments.

FIG. 3 depicts a flowchart of an exemplary method, in accordance with an exemplary embodiment. In some embodiments, as described below in connection with FIG. 3, method 300 may be carried out by an access node, such as access node 105. In other embodiments, the method may be carried out by another network entity mentioned herein, such as BTS 103, RNC 104, PDSN 106, some other network entity, or some combination thereof. In general, method 300 may be carried out by a base station, an access node, a BTS, a BSC, an RNC, an MSC, a PDSN, some other network entity, or perhaps some combination thereof.

As shown in FIG. 3, method 300 begins at step 302, with access node 105 providing packet-data service to access terminals. Step 302 may involve (a) providing wireless service over an air interface in a wireless coverage area (such as a cell or sector) and (b) providing transport service over a packet-data network. The wireless service may be according to EV-DO (e.g. IS-856, Rel. 0 and/or IS-856, Rev. A), among many possible examples. At least one of the access terminals may be or include a cellular telephone, a personal digital assistant, a computer, a laptop computer, a laptop air card, and a hybrid access terminal. Furthermore, the packet-data network may include at least one of a privately-operated core packet-data network, such as PDN 108, and the Internet (which is represented by PDN 112 in some embodiments).

At step 304, access node 105 measures, over at least the packet-data network, each packet-transport metric in a set of one or more packet-transport metrics, at least one of which may be a VoIP-quality metric. The set of one or more packet-transport metrics may include at least one of delay, jitter, and packet loss. Step 304 may involve measuring each packet-transport metric in the set of one or more packet-transport metrics between access terminals (that access node 105 is serving) and endpoints with which the access terminals are communicating. At least one of the endpoints could be a mobile station, an access terminal, a landline phone, a conference server, or a gateway.

In other embodiments, step 304 may involve measuring each packet-transport metric in the set of one or more packet-transport metrics between at least one network element and endpoints with which the access terminals (that access node 105 is serving) are communicating. That network element could be access node 105, but could instead be any other element, such as but not limited to a base station, a BTS, a BSC, an RNC, an MSC, and a PDSN. As above, at least one of the endpoints could be a mobile station, an access terminal, a landline phone, a conference server, or a gateway, among many possible examples.

Note that, in general, step 304 may involve measuring each packet-transport metric in the set of one or more packet-transport metrics for at least one type of packet-data communication selected from the group consisting of VoIP, PTT, videoconferencing, and streaming media. That is, decisions regarding the setting or clearing of DRCLocks for one or more access terminals could be conducted so as to take into account the packet-transport metrics being experienced by VoIP users (which may include PTT users) in particular, or perhaps some different or larger class of latency-sensitive types of packet-data communication. It is also possible to use the metrics being experienced sector wide in connection with all types of packet-data communication. And other possibilities exist as well.

At step 306, access node 105 sets a DRCLock for at least one of the access terminals based at least in part on the one or more measured packet-transport metrics. Note that access node 105 may maintain a set of one or more packet-transport-metric thresholds, where each packet-transport-metric threshold corresponds to a respective packet-transport metric in the set of one or more packet-transport metrics.

Thus, if the set of metrics was {delay, jitter, packet loss}, then access node 105 may maintain a table such as threshold table 200 of FIG. 2. Furthermore, access node 105 may take a measurement of each packet-transport metric in the set of metrics once every period of time (e.g. once every 5 ms). At the same or a different frequency, access node 105 may determine whether a most-recent measurement of each packet-transport metric is less than that metric's corresponding threshold and, if not, set a DRCLock for at least one of the access terminals.

In another embodiment in which metric thresholds are maintained for each respective metric, access node 105 may receive a DRC request from an access terminal, and responsively determine whether a most-recent measurement of each packet-transport metric is less than that metric's corresponding threshold: if so, access node 105 may grant the DRC request; if not, access node 105 may set a DRCLock for the access terminal.

Note that step 306 may involve access node setting a DRCLock for a random selection of the access terminals. In another embodiment, step 306 may involve access node 105 setting a DRCLock for those access terminals engaged in a certain type of packet-data communication (e.g. best-efforts communication, so as to improve performance for latency-sensitive types of communication such as VoIP or PTT). In another embodiment, step 306 may involve access node 105 setting a DRCLock for access terminals associated with a lower tier of service. In another embodiment, step 306 may involve access node 105 setting a DRCLock for at least one of the access terminals based (a) at least in part on the one or more measured packet-transport metrics and (b) at least in part on whether DRC requests from respective access terminals are able to be properly received (and/or at least in part on one or more other conditions). And certainly other possibilities exist as well.

In one embodiment, access node 105 may determine that each packet-transport metric in the set of packet-transport metrics has reverted below a respective threshold value for that metric, and responsively clear at least one DRCLock for at least one of the access terminals.

3. Conclusion

Various exemplary embodiments have been described above. Those skilled in the art will understand, however, that changes and modifications may be made to those examples without departing from the scope of the claims.

The invention claimed is:

1. A method comprising:
providing packet-data service to access terminals, wherein providing packet-data service to access terminals comprises (a) providing wireless service over an air interface in a wireless coverage area portion of a network and (b) providing transport service over wireline portion of the network;
measuring, over at least the wireline portion of the network, each packet-transport traffic metric in a set of one or more packet-transport traffic metrics; and
setting a DRCLock for at least one of the access terminals based at least in part on the one or more measured packet-transport traffic metrics.

2. The method of claim 1, carried out by at least one of, an access node, a base transceiver station (BTS), a base station controller (BSC), a radio network controller (RNC), a mobile switching center (MSC), and a packet data serving node (PDSN).

3. The method of claim 1, wherein providing wireless service comprises providing wireless service according to at least one of IS-856, Release 0 and IS-856, Revision A.

4. The method of claim 1, wherein the wireless coverage area portion of a network is a cell or a sector.

5. The method of claim 1, wherein at least one of the access terminals comprises one or more of a cellular telephone, a personal digital assistant, a computer, a laptop computer, a laptop air card, and a hybrid access terminal.

6. The method of claim 1, wherein the wireline portion of the network comprises at least one of a privately-operated core packet-data network and the Internet.

7. The method of claim 1, wherein at least one packet-transport traffic metric is a voice over IP (VoIP)-quality metric.

8. The method of claim 1, wherein measuring, over at least the wireline portion of the network, each packet-transport traffic metric in the set of one or more packet-transport traffic metrics comprises measuring each packet-transport traffic metric in the set of one or more packet-transport traffic metrics between access terminals and endpoints with which the access terminals are communicating.

9. The method of claim 8, wherein at least one of the endpoints is a mobile station, an access terminal, a landline phone, a conference server, or a gateway.

10. The method of claim 1, wherein measuring, over at least the wireline portion of the network, each packet-transport traffic metric in the set of one or more packet-transport traffic metrics comprises measuring each packet-transport traffic metric in the set of one or more packet-transport traffic metrics between at least one network element and endpoints with which the access terminals are communicating.

11. The method of claim 10, wherein the at least one network element is one or more of an access node, a base transceiver station (BTS), a base station controller (BSC), a radio network controller (RNC), a mobile switching center (MSC), and a packet data serving node (PDSN).

12. The method of claim 10, wherein at least one of the endpoints is a mobile station, an access terminal, a landline phone, a conference server, or a gateway.

13. The method of claim 1, wherein measuring, over at least the wireline portion of the network, each packet-transport traffic metric in the set of one or more packet-transport traffic metrics comprises measuring each packet-transport traffic metric in the set of one or more packet-transport traffic metrics for at least one type of packet-data communication selected from the group consisting of voice over IP (VoIP), push to talk (PTT), videoconferencing, and streaming media.

14. The method of claim 1, wherein the set of one or more packet-transport traffic metrics comprises at least one of delay, jitter, and packet loss.

15. The method of claim 1, further comprising:
maintaining a set of one or more packet-transport traffic metric thresholds, wherein each packet-transport traffic metric threshold corresponds to a respective packet-transport traffic metric in the set of one or more packet-transport traffic metrics, wherein measuring each packet-transport traffic metric in the set of one or more packet-transport traffic metrics comprises taking a measurement of each packet-transport traffic metric in the set of one or more packet-transport traffic metrics once every period of time, wherein setting a DRCLock for at least one of the access terminals based at least in part on the one or more measured packet-transport traffic metrics comprises carrying out the following steps once every period of time:

(a) determining whether a most-recent measurement of each packet-transport traffic metric is less than that traffic metric's corresponding threshold, and (b) setting a DRCLock for at least one of the access terminals in response to determining that the most recent measurement of each packet-transport traffic metric is not less than that traffic metric's corresponding threshold.

16. The method of claim 1, further comprising:

maintaining a set of one or more packet-transport traffic metric thresholds, wherein each packet-transport traffic metric threshold corresponds to a respective packet-transport traffic metric in the set of one or more packet-transport traffic metrics, wherein setting a DRCLock for at least one of the access terminals based at least in part on the one or more measured packet-transport traffic metrics comprises:

(a) receiving a DRC request from an access terminal, and responsively:

(b) determining whether a most-recent measurement of each packet-transport traffic metric is less than that metric's corresponding threshold, (c) setting a DRCLock for the access terminal in response to determining that the most recent measurement of at least one packet-transport traffic metric is not less than that traffic metric's corresponding threshold.

17. The method of claim 1, wherein setting a DRCLock for at least one of the access terminals based at least in part on the one or more measured packet-transport traffic metrics comprises setting a DRCLock for a random selection of the access terminals.

18. The method of claim 1, wherein setting a DRCLock for at least one of the access terminals based at least in part on the one or more measured packet-transport traffic metrics comprises setting a DRCLock for those access terminals engaged in a certain type of packet-data communication.

19. The method of claim 18, wherein the certain type of packet-data communication is best-efforts communication.

20. The method of claim 1, wherein setting a DRCLock for at least one of the access terminals based at least in part on the one or more measured packet-transport traffic metrics comprises setting a DRCLock for an access terminal based on a tier of service associated with the access terminal.

21. The method of claim 1, wherein setting a DRCLock for at least one of the access terminals based at least in part on the one or more measured packet-transport traffic metrics comprises setting a DRCLock for at least one of the access terminals based (a) at least in part on the one or more measured packet-transport traffic metrics and (b) at least in part on whether DRC requests from respective access terminals have been successfully received.

22. The method of claim 1, further comprising determining that each packet-transport traffic metric in the set of packet-transport traffic metrics has reverted below a respective threshold value for that metric, and responsively clearing at least one DRCLock for at least one of the access terminals.

23. An access node comprising:

a wireless-communication interface;

a backhaul connection;

a processor; and data storage comprising instructions executable by the processor for carrying out functions including:

providing packet-data service to access terminals, wherein providing packet-data service to access terminals comprises (a) using the wireless-communication interface to provide wireless service over an air interface in a wireless coverage area portion of a network and (b) using the backhaul connection to provide transport service over a wireline portion of the network;

measuring, over at least the wireline portion of the network, each packet-transport traffic metric in a set of one or more packet-transport traffic metrics; and setting a DRCLock for at least one of the access terminals based at least in part on the one or more measured packet-transport traffic metrics.

* * * * *